Figure 1:
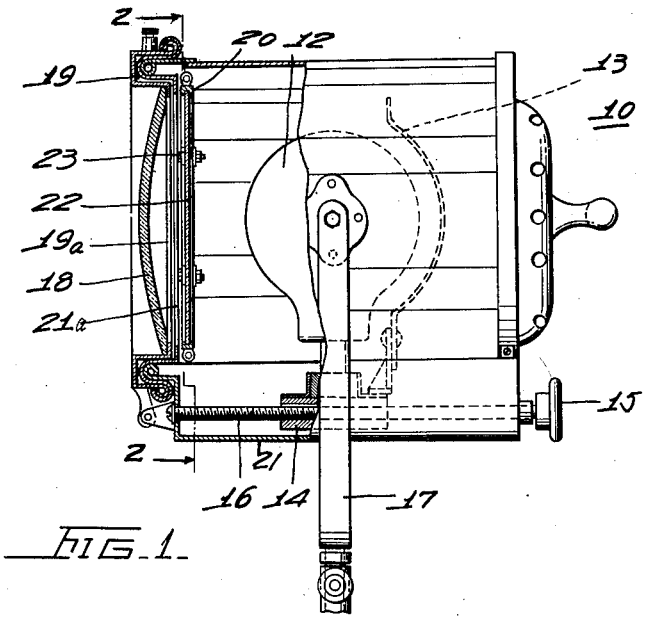

Feb. 4, 1964 TADAYOSHI AKITA ETAL 3,120,352

SPOT LIGHT UNIT

Filed Jan. 2, 1962

INVENTORS
TADAYOSHI AKITA, TATSU-
SHI OHTA & YASUO ITO
BY
ATTORNEY

United States Patent Office 3,120,352
Patented Feb. 4, 1964

3,120,352
SPOT LIGHT UNIT
Tadayoshi Akita, 436 Seijo-cho, Setagaya-ku, Tokyo, Japan; Tatsushi Ohta, 440 Nogeyama Jutaku 29, Nishi-ku, Yokohama, Japan; and Yasuo Ito, 1453 Kita-Tsunashima, Minato-ku, Yokohama, Japan
Filed Jan. 2, 1962, Ser. No. 163,422
Claims priority, application Japan Dec. 31, 1960
1 Claim. (Cl. 240—47)

The invention relates to an improved condensing-lens spot light unit, wherein highly effective means are provided for filtering out unpleasant and unhealthy heat radiation rays otherwise issuing from the spot light, while in operation.

Spot light units find their broad use, especially in spot lighting close-up scenes. Players suffer highly in these cases from heat rays projected upon them, although the studios be equipped with efficient cooling and ventilating means. This unpleasant condition retards and disturbs considerably the plays to be displayed or televised. In addition, troubles have arisen frequently in the field of human health, when actors and actresses have long been engaged in such jobs.

It is therefore the main object of the invention to provide an improved spot-light unit having highly efficient means for filtering out heat rays otherwise emanating therefrom, while being of highly simplified design.

For attaining the above object, the spot light unit according to the invention is characterized in that one or more plain discs made from heat ray absorbing glass are mounted in thin metallic, resiliently supported mounting means, which are arranged directly behind or in front of a Fresnel lens forming part of said unit.

Heat ray absorbing glass has been employed in the conventional technique, especially projectors. Sometimes, it has been employed to constitute the lens system in the projector, or sometimes that kind of glass has been arranged between condensing lens elements for preventing the film from overheating. It was now found according to the invention that the mere employment of such kind of glass shaped in the form of filters is insufficient to obviate the above mentioned disadvantages and difficulties inherent in the conventional spot light units and that the combination of the employment of heat ray absorbing glass for the filtering purpose together with effective resilient mounting means for allowing free expansion and contraction of the filter means exposed to the intense light beams issuing from the light source substantially overcomes the prior difficulties. In addition, it is necessary to position the filter means as remote as possible from the light source.

The above and further objects and novel features of the present invention will more fully appear from the following detailed description when the same is read in connection with the accompanying drawing. It is to be expressly understood, however, that the drawing is for the purpose of illustration only and is not intended as a definition of the limits of the invention.

Figure 2:
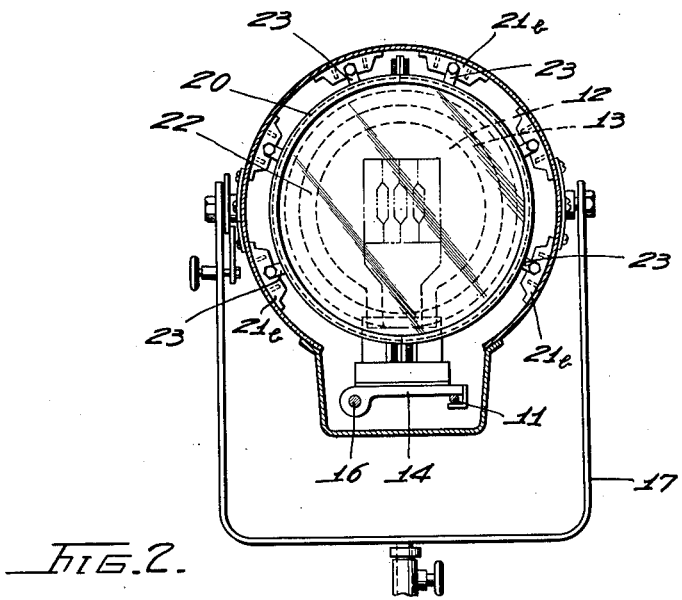

In the drawing,

FIG. 1 is a side view of the spot light unit, part of which has been shown in section taken on the line 1—1 in FIG. 2 for the illustration of the inside structure; and FIG. 2 is a sectional front view of the said unit taken on the line 2—2 in FIG. 1.

Now, referring to the drawing, numeral 10 denotes generally the spot light unit according to the invention. An electric bulb 12 serving as the light source is detachably mounted upon a slidable socket 14, which carries a reflector 13 arranged behind the bulb. Through the slide socket 14 passes an adjustable screw 16 having at its projecting one end an operating knob 15 attached thereto. A guide bar 11 extends in parallel to the screw 16 over the whole length thereof for sliding guidance of the socket 14. As a consequence by manipulating the knob 15 in one direction or another the socket may be advanced or retracted according to an operator's will for adjusting the light source in its position. A main casing 21 having a substantially cylindrical shape contains therein all of said constituents except the operating knob 15, as shown, and is in turn pivotally mounted on a yoke 17. A front cover 19 having a large central passage opening 19a and a Fresnel lens 18 covering the latter, is telescopically attached onto the front open end of said main casing 21. Directly behind the end opening 21a of the main casing, there is provided a ring-shaped mount 20 fabricated from a thin metallic sheet supporting a transparent filter disc 22 made of a suitable heat ray absorbing glass. The mount 20 has a number of radial thin tongues 23, which are detachably fixed to the corresponding number of mounting pieces 21b on the inside wall surface of the main casing 21 by means of bolts and nuts. This resilient filter mount will allow effectively the expansion and contraction of the filter disc caused by considerable temperature variations normally encountered. If necessary, a plurality of such filter discs 22 may be arranged in a parallel relationship, yet separated from one another, although not shown. If desirable, one or more such filter discs may be arranged in front of the Fresnel lens 18, in addition to, or in place of the shown disc 22. As for the heat ray absorbing glass for these discs, it is desirable to use a material having a high absorbing power preferably greater than 90%, as well as a low expansion coefficient preferably in the order of $53 \times 10^{-7}$. If necessary, the filter disc may have embedded therein fine wires or nets for the strengthening thereof. Furthermore, the disc may be coated with a heat conducting film such as metallic layer, oxide layer or the like, thus increasing the heat resistant power of the disc.

By employing these measures, succesfsul illumination can be assured with use of a high power ranging from 500 w. to 20 kw. without any fear of breakage or damage and at a high operating efficiency.

It is to be noted that with the use of a conventional spot light unit, such as a solar spot light so-called of 2 kw., a small water pool, if placed in the immediate vicinity of the unit, will boil within 15 minutes. It will thus be seen that a considerable amount of radiant heat emanates from a conventional spot light. On the contrary, with use of our novel unit, no appreciable rise in the temperature of the water under otherwise similar operating conditions may be noted. Thus, a person who stands at a small distance, say 20 cm., from the light will not be subjected to any unpleasant and unhealthy conditions. In this way, the conventional drawbacks and difficulties met by virtue of overheating can be completely obviated.

It will thus be clear from the foregoing that according to this invention a unique spot light unit is provided by the use of which players illuminated thereby can effectively be protected against suffering from the heat caused by otherwise issuing heat radiation emanating from the light source.

While a preferred form of spot light unit embodying the present invention has been shown and described, it will be understood that the unit is capable of further modification and variation while still embodying the principles of the invention. It is to be understood, therefore, that the invention is to be interpreted in accordance with its broader scope and spirit as set forth in the claim appended hereto.

The invention having thus been described, that which is believed to be new and for which protection by Letters Patent is desired is:

In combination with a condensing-lens spot light including a cylindrical housing, a light source disposed within and at one end of said housing, a Fresnel lens mounted at the opposite end of said housing, and a reflector on the side of said source opposite to said lens; a disc-shaped flat heat-absorbing filter adjoining said lens on the side of said source, and a resilient filter mount comprising a peripheral frame of thin sheet metal encircling the edge of said filter, a plurality of thin supporting tongues extending radially outwardly from said frame in spaced angular relation to each other, and means removably connecting said tongues to the inside of said housing.

References Cited in the file of this patent
UNITED STATES PATENTS

| | | |
|---|---|---|
| 2,069,950 | Greppen | Feb. 9, 1937 |
| 2,173,325 | Alexander | Sept. 19, 1939 |
| 2,307,301 | Richardson | Jan. 5, 1943 |
| 2,827,554 | Gunther et al. | Oct. 12, 1954 |
| 3,020,395 | Peltz | Feb. 6, 1962 |